(12) United States Patent
Saka

(10) Patent No.: US 7,721,860 B2
(45) Date of Patent: May 25, 2010

(54) POWER COUPLING DEVICE

(75) Inventor: Tokimori Saka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 448 days.

(21) Appl. No.: 11/758,980

(22) Filed: Jun. 6, 2007

(65) Prior Publication Data

US 2008/0000747 A1     Jan. 3, 2008

(30) Foreign Application Priority Data

Jun. 30, 2006    (JP)    .............................. 2006-181105

(51) Int. Cl.
*F16D 41/16*    (2006.01)

(52) U.S. Cl. .................... 192/43.1; 192/46; 192/85.48; 188/82.3; 188/82.74

(58) Field of Classification Search ........................ None
See application file for complete search history.

(56) References Cited

U.S. PATENT DOCUMENTS

| | | | | |
|---|---|---|---|---|
| 4,222,473 | A * | 9/1980 | Kopich | ....................... 192/43.1 |
| 5,343,992 | A | 9/1994 | Stark et al. | |
| 5,927,455 | A | 7/1999 | Baker et al. | |
| 5,937,980 | A * | 8/1999 | Dick | .......................... 192/43.1 |
| 6,116,394 | A | 9/2000 | Ruth | |
| 6,186,299 | B1 | 2/2001 | Ruth | |
| 6,244,965 | B1 | 6/2001 | Klecker et al. | |
| 6,814,201 | B2 | 11/2004 | Thomas | |
| 2004/0238306 | A1 * | 12/2004 | Reed et al. | .................. 192/43.1 |
| 2005/0245346 | A1 | 11/2005 | Blair et al. | |

* cited by examiner

*Primary Examiner*—David D Le
*Assistant Examiner*—Ryan Dodd
(74) *Attorney, Agent, or Firm*—Alleman Hall McCoy Russell & Tuttle LLP

(57) ABSTRACT

There is provided a power coupling device comprising first and second coupling members, at least one of which is capable of rotating about a common axis and relative to each other. The first coupling member has a pocket, and the second coupling member has notches. The power coupling member also comprises first and second struts arranged at least partly in the pocket. Each of the first and second struts is urged to emerge from the pocket and capable of engaging with one of the notches. The first strut is capable of transmitting torque between the first and second coupling members only in a first direction, and the second strut is capable of transmitting torque between the first and second coupling members only in a second direction that is opposite to the first direction. The power coupling device further comprises first and second retainer plates arranged between the first and second coupling members capable of moving in a plane perpendicular to the common axis, for example, of rotating about the common axis, and independently from each other. The first retainer plate has a first hole which the first or second strut can pass through. The second retainer plates has a second hole which the first or second strut can pass through when the second hole is aligned with the first hole and the first or second strut. By moving the first and second retainer plates, this power coupling device can achieve the neutral state and the bidirectional lock state in addition to forward and reverse lock states.

20 Claims, 8 Drawing Sheets

Bidirectional Lock

Bidirectional Lock

Bidirectional Lock

Forward Lock

POWER COUPLING DEVICE

BACKGROUND

The present description relates to a power coupling device which can switch a torque transmission state between two coupling members.

There is known a power coupling device which may engage and disengage two rotational coupling members depending on a direction of torque transfer. When a torque transfer between the two coupling members is in one direction, the power coupling device engages the two coupling members and transfers torque from one to the other. When the torque transfer is in the other direction, the power coupling device disengages the two rotational members and permits a freewheeling overrunning motion between the two coupling members.

There is known and presented, for example in U.S. Pat. No. 6,244,965, a two-way overrunning coupling device which controllably takes forward and reverse lock states. When the device takes the forward lock state, a first strut pivoted at its one end on the first coupling member penetrates through a hole of a retainer plate arranged between the first and second coupling members. The relative rotation between the first and second coupling members in one direction is prevented by engaging the first strut with a recess of the second coupling member. But it is permitted in the other direction by the second coupling member running over the first strut.

When the overrunning coupling device takes the reverse lock state, the retainer plate retains the first strut in a pocket of the first coupling member, and instead a second strut pivoted at its end opposite to that of the first strut in the circumferential direction penetrates a hole of the retainer plates. Then, the relative rotation between the first and second coupling members in the other direction is permitted by the second strut running over the first pivot, but it is prevented in the one direction by the second strut engaging with the recess of the second coupling member.

The coupling device of the '965 patents can lock the relative rotation between the first and second coupling members in either of the forward and reverse directions, and a forward lock state and a reverse lock state can be achieved. However, it can not enable a free rotation in the both directions nor a complete engagement between the first and second coupling members.

SUMMARY

Accordingly, there is provided, in one aspect of the present description, a power coupling device comprising first and second coupling members, at least one of which is capable of rotating about a common axis and relative to each other. The first coupling member has a pocket, and the second coupling member has notches. The power coupling member also comprises first and second struts arranged at least partly in the pocket. Each of the first and second struts is urged to emerge from the pocket and capable of engaging with one of the notches. The first strut is capable of transmitting torque between the first and second coupling members only in a first direction, and the second strut is capable of transmitting torque between the first and second coupling members only in a second direction that is opposite to the first direction. The power coupling device further comprises first and second retainer plates arranged between the first and second coupling members capable of moving in a plane perpendicular to the common axis and independently from each other. The first retainer plate has a first hole which the first or second strut can pass through. The second retainer plates has a second hole which the first or second strut can pass through when the second hole is aligned with the first hole and the first or second strut.

According to the above coupling device, by moving the first and second retainer plates independently, it is possible to individually retract the first and second struts into the pocket and let them emerge from the pocket. For example, when the second retainer plate covers the first hole, none of the first and second struts engages with any of the recesses of the second coupling member. Therefore, the first and second coupling members can rotate relative to each other in either direction, and a neutral state can be achieved.

Further, by displacing the first and second retainer plates so that the both first and second struts pass through the first and second holes, the both first and second struts engage with the recesses of the second coupling member so that torque can be transmitted in the both directions. Therefore, the first and second coupling members can be engaged with each other in the both directions, and a bidirectional lock state can be achieved.

In conclusion, this power coupling device can achieve the neutral state and the bidirectional lock state in addition to forward and reverse lock states.

In an embodiment, the first and second retainer plates may be configured to be capable of rotating about the common axis so that a common shaft can be arranged penetrating the first and second coupling members and retainer plates.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

In FIGS. 1 through 8, a power coupling device according to a first embodiment of the present description will be described. First referring to FIG. 1, there are shown a first coupling member 1 and a second coupling member 2 both of which are formed in a circular disk shape centered in a common axis L (shown in FIGS. 4 through 8). The power coupling device may selectively lock relative rotation between the first coupling member 1 and the second coupling member 2 as described in greater detail below.

One of the first and second coupling members 1 and 2, for example, the first coupling member 1 may be permanently fixed to a case of a power transmission apparatus such as an automatic transmission of an automotive vehicle. In that case, the second coupling member 2 may be rotated about the common axis L and selectively locked in either direction. Therefore, the power coupling device 100 may function as a brake. Otherwise, each of the first and second coupling members 1 and 2 may rotate about the common axis L so that the power coupling device may function as a clutch.

Figure 1:
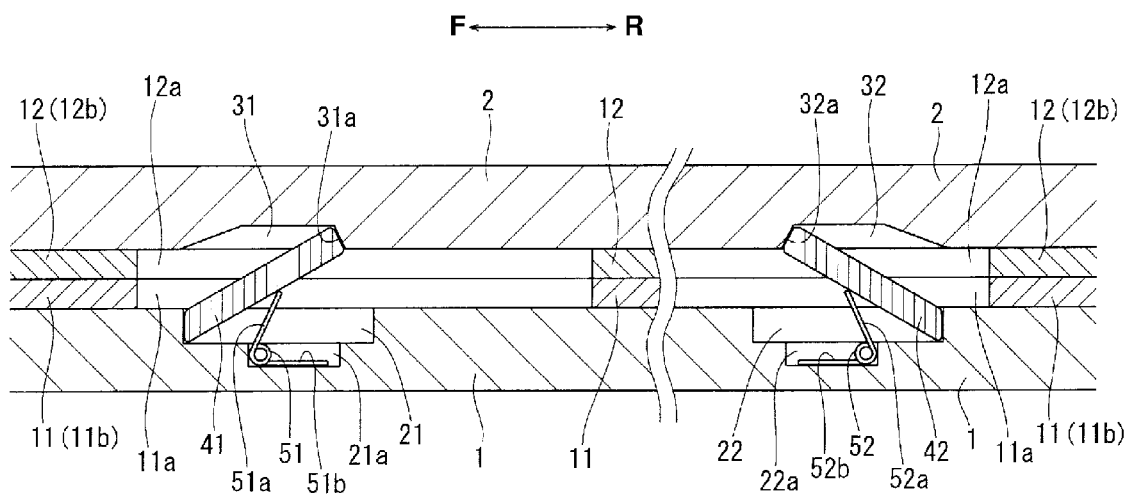
FIG. 1 is a cross sectional view of a power coupling device according to an embodiment of the present description along a line X1-X1 in FIG. 5, showing its bidirectional lock state.

Still referring to FIG. 1, there are shown a first retainer plate 11 and a second retainer plate 12 arranged between the first and second coupling members 1 and 2. The first coupling member 1, the first retainer plate 11, the second retainer plate 12 and the second coupling member 2 are arranged in this order in the direction of the common axis L.

The first and second coupling members 1 and 2 are formed thicker so as to be capable of transmitting torque between them. On the other hand, neither of the first and second retainer plates 11 and 12 transmits torque so that they are formed thinner. The coupling members 1 and 2 and the retainer plates 11 and 12 are made with metal such as an iron based metal.

Figure 5:
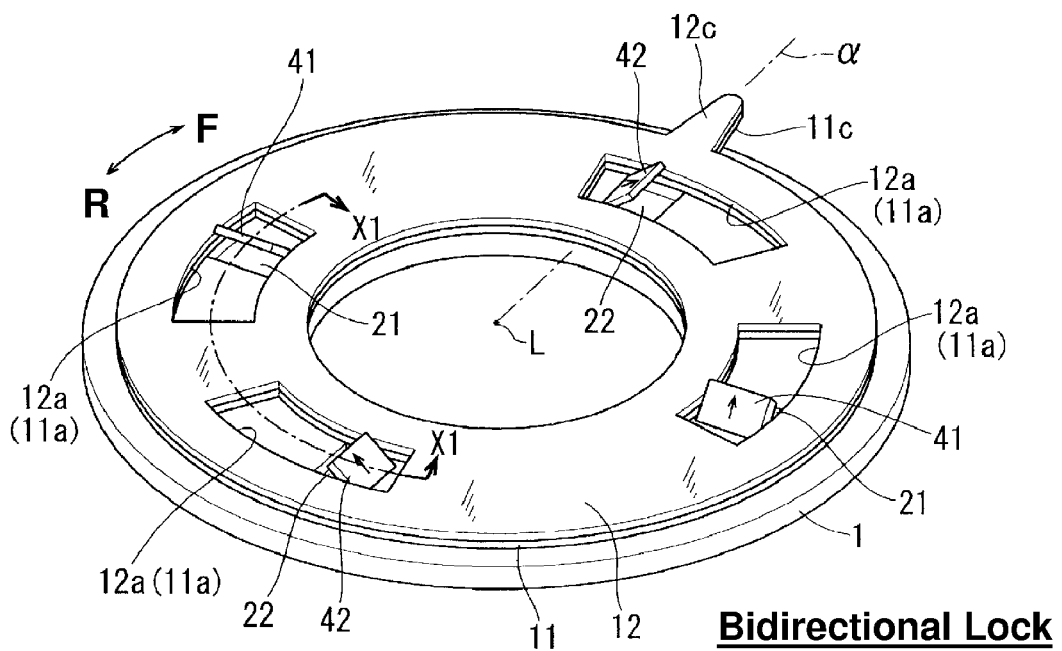
FIG. 5 is a perspective view of the power coupling device shown in FIG. 4, showing the bidirectional lock state.

As shown in FIG. 5, there are provided two first pockets (concave portion) 21 on an opposing side surface of the first coupling member 1 which faces toward the second coupling member 2. The first pockets 21 are angularly spaced with each other by 180° in the circumferential direction of the first coupling member 1. Also, there are also provided, on the opposing side surface of the first coupling member 1, two second pockets 22 also angularly spaced with each other by 180°. The neighboring first and second pockets 21 and 22 are angularly spaced with each other by 90° and have same size and shape.

Referring back to FIG. 1, there are provided two first recesses 31 (only one is illustrated in FIG. 1) on an opposing surface of the second coupling member 2 which faces toward the first coupling member 1. The two first recesses 31 are arranged angularly spaced with each other by 180° and angularly corresponding to the two pockets 21 or 22 of the first coupling member 1. There are also provided, on the opposing surface of the second coupling member 2, two second recesses 32 (only one is illustrated in FIG. 1) which are arranged angularly spaced with reach other by 180° and angularly corresponding to the two pockets 21 or 22 of the first coupling member 1. The neighboring recesses 31 and 32 are angularly spaced with each other by 90° and formed symmetrically in the circumferential direction around the common axis L. Therefore, the first recesses 31 may be angularly aligned with the first pockets 21, and the second recesses 32 may be angularly aligned with the second pockets 22.

Figure 4:
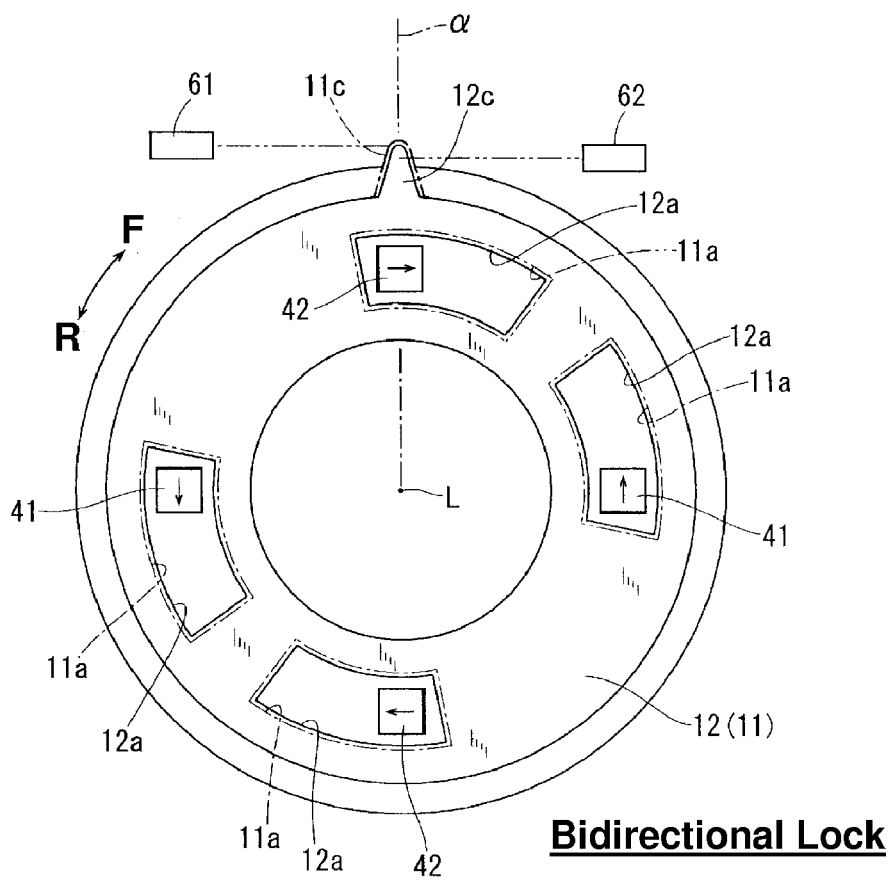
FIG. 4 is a plane view of the power coupling device according to the embodiment, illustrating a state with a second coupling member removed for illustration purpose.

The first and second retainer plates 11 and 12 can be rotated about the common axis L. They are configured with same shape and size although in FIG. 4 they are illustrated slightly different from each other to show clearly the first retainer plate 11 arranged under the second retainer plate 12. The first retainer plate 11 has four holes (openings) 11a angularly spaced with each other and has non-openings 11b anywhere else. In the same manner, the second retainer plate 12 has four holes 12a angularly spaced with each other and has non-openings 12b. As shown in FIGS. 1 and 4, when the first and second retainer plates 11 and 12 are in a predetermined relative angular relationship, they may have their holes 11a and 12a perfectly aligned with each other. The holes 11a and 12a are of an annular shape centered at the common axis L. Their width in the radial direction of the retainer plates 11 and 12 is substantially same as that of the pockets 21 and 22. Their length in the circumferential direction of the retainer plates 11 and 12 is substantially longer than that of the pockets 21 and 22.

A first strut 41 is arranged in the first pocket 21 of the first coupling member 1, and it is pivoted at its pivot end in the circumferential direction so that a swing end can be retained within the first pocket 21 or can eject from the first pocket 21 toward the second coupling member 2. The first strut 41 is made rigid from iron based metal, for example, so as to have a larger torque capacity.

Similarly, a second strut 42 is arranged in the second pocket 22 of the first coupling member 1, and it is pivoted at its pivot end in the circumferential direction in the same manner as the first strut 41 is. But, the pivot end of the second strut 42 is arranged opposite to that of the first strut 41 in the circumferential direction. The second strut 42 is also made rigid from iron based metal.

Referring to FIG. 1, there is arranged, in the first pocket 21, a first spring 51 to urge the swing end of the first strut 41 to eject from the pocket 21. There is arranged a second spring 52 in the second pocket 22 in the same manner as the first spring 51. The first and second springs 51 and 52 are coil springs with same size and shape. A coil axis of the spring 51 or 52 extends in the radial direction of the first coupling member 1. One end 51a or 52a of the coil spring 51 or 52 contacts with the lower surface of the strut 41 or 42. The other end 51b or 52b contacts with the bottom surface of the pocket 21 or 22. When the strut 41 or 42 is retracted in the pocket 21 or 22 as shown in FIG. 2 or 3, an angle between the ends 51a and 51b (or 52a and 52b) is smaller than when the strut 41 or 42 ejects from the pocket 21 or 22 as shown in FIG. 1.

Figure 2:
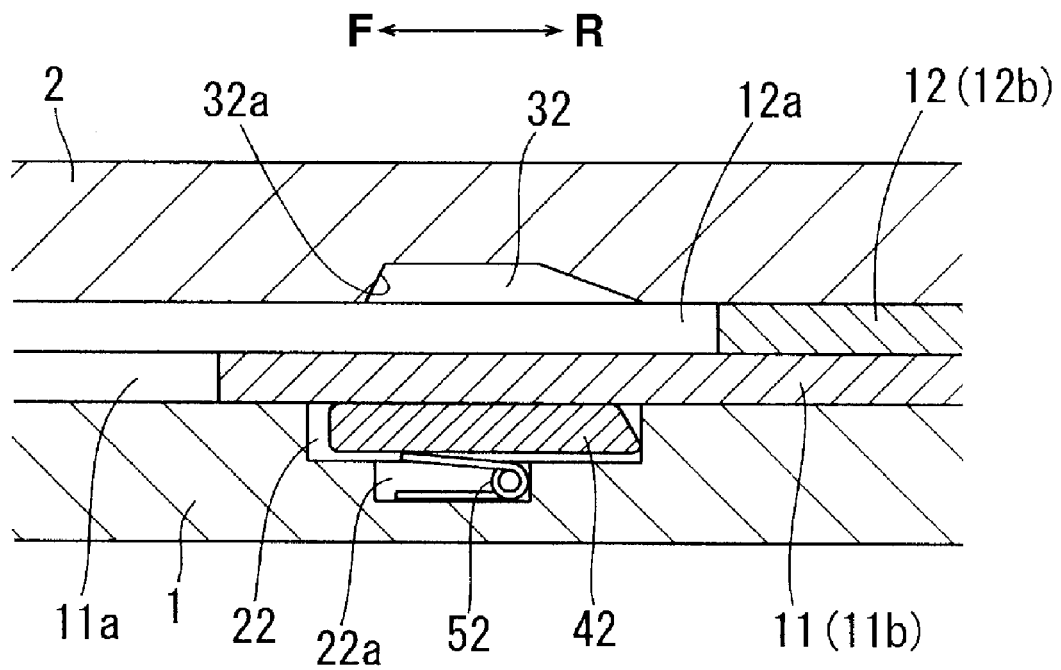
FIG. 2 is a cross sectional view of the power coupling device according to the embodiment, illustrating a second strut which a first retainer plate retracts into a pocket of the first coupling member.
Figure 3:
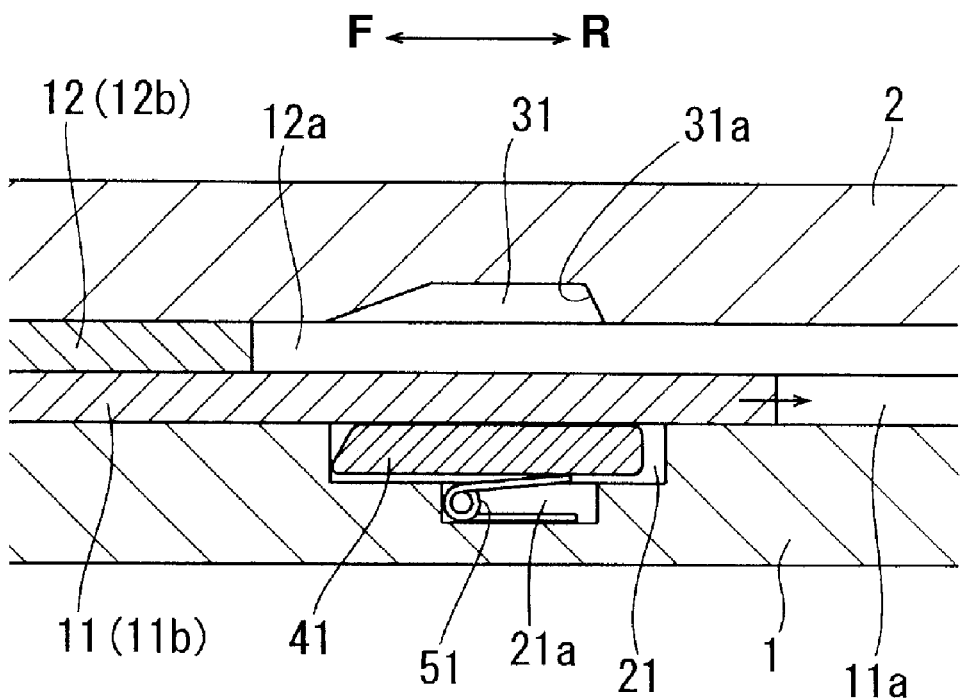
FIG. 3 is a cross sectional view of the power coupling device according to the embodiment, illustrating a first strut which the first retainer plate retracts into a pocket of the first coupling member.

As shown in FIGS. 1 through 3, there is formed a concave spring storage 21a or 22a at the bottom of the pocket 21 or 22. The spring storage 21a or 22a make it possible to arrange the spring 51 or 52 lower so that the angle between the ends 51a and 51b (or 52a and 52b) can be made an appropriate angle even when swing end of the strut 41 or 42 is retracted into the pocket 21 or 22.

When the swing end of the strut 41 or 42 is ejected from the pocket 21 or 22 to transmit torque, the pocket 21 or 22 may be upwardly tilted by 30 or 40 degrees compared to when it is retracted. When ejected, the swing end of the strut 41 or 42 contacts in plane with a contact surface or notch 31a or 32a of the recess 31 or 32. The notch 31a or 32a is tilted less than another end surface of the recess as shown in FIGS. 1 through 3. At the same time, the pivot end of the strut 41 or 42 contacts in plane with one of end surfaces of the pocket 21 or 22 in the circumferential direction of the first coupling member 1.

As can be seen in FIG. 1, when torque is transmitted from the second coupling member 2 to the first coupling member 1 through the first strut 41, the torque is in a forward direction F, and its reaction torque from the first coupling member 1 to the second coupling member 2 is in a reverse direction R. On the other hand, through the second strut 42, torque transmitted from the second coupling member 2 to the first coupling member 1 is in the reverse direction R, and torque from the first coupling member 1 to the second coupling member 2 is in the forward direction F. In other words, directions of the torque transmission are opposite between those through the first and second struts 41 and 42.

As shown in FIG. 4, a protruding portion 11c is formed at the periphery of the first retainer plate 11. A first actuator 61 is coupled to the protruding portion 11c and attached to the casing. Similarly, a protruding portion 12c is formed at the periphery of the second retainer plate 12, and a second actuator 62 is coupled to the protruding portion 12c and attached to the casing. Each of the first and second retainer plates can be rotated about the common axis L and independently from each other by a corresponding one of the first and second actuators 61 and 62.

Now, functions of the above described coupling device will be described, referring to FIGS. 4 and 8, which show a state with the second coupling member 2 taken out for the clarity of illustration of movements of the struts 41 and 42 and others. In the description below, a clockwise direction in the figures is considered the forward direction F, and a counterclockwise direction is considered the reverse direction R.

In a bidirectional lock state shown in FIGS. 4 and 5, the second coupling member 2 is angularly regulated or locked with respect to the first coupling member 1 in the both directions about the common axis L. In the bidirectional lock state, the both protruding portions 11c and 12c are at a reference angular position α. The all openings 11a and 11b of the first and second retainer plates 11 and 12 are perfectly aligned with the pockets 21 and 22.

In the bidirectional lock states shown in FIGS. 4 and 5, the swing end of the first strut 41 ejects from the pocket 21, passes through the openings 11a and 12a of the first and second retainer plates 11 and 12 and engages with notch 31a of the first recess 31 as shown in FIG. 1. Thereby, the first strut 41 transmits torque from the second coupling member 2 to the first coupling member 1 in the forward direction F or vice versa in the reverse direction R and engages the second coupling member 2 with the first coupling member 1 in the forward direction F. At the same time, the swing end of the second strut 42 ejects from the pocket 22, penetrates through the openings 11a and 12a of the first and second retainer plates 11 and 12 and engages with the notch 32a of the second recess 32 as shown in FIG. 1. Thereby, the second strut 42 transmits torque from the second coupling member 2 to the first coupling member in the reverse direction R or vice versa in the forward direction F and engages the second coupling member 2 with the first coupling member 1 in the reverse direction R.

In the bidirectional lock state, either of the circumferential ends of the holes 11a or 12a of the retainer plates 11 or 12 is located closer to the pivot end of the strut 41 or 42 than the swing end. Therefore, the strut 41 or 42 can be retracted by only slightly turning the retainer plate 11 or 12, as described in more detail below.

Figure 6:
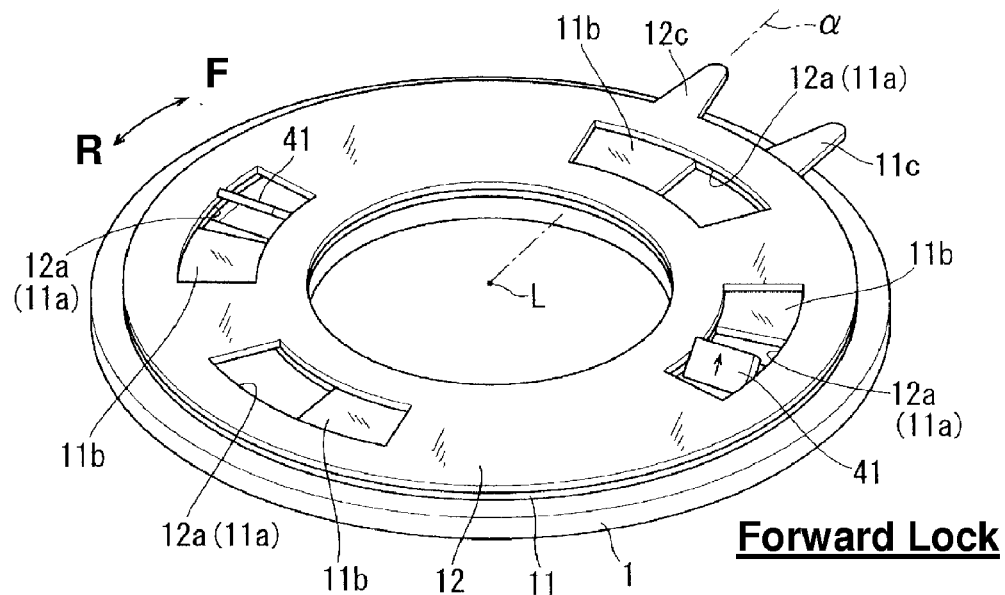
FIG. 6 is a perspective view of the power coupling device according to the embodiment, showing a forward lock state.

Referring to FIG. 6, only the first retainer plate 11 is shown to be rotated slightly in the forward direction F from the reference position a to retract only the second strut 42 into the second pocket 22, also as shown in FIG. 2. This achieves a forward lock state where the first strut 41 restricts the forward rotation F of the second coupling member 2 with respect to the first coupling member 1.

Figure 7:
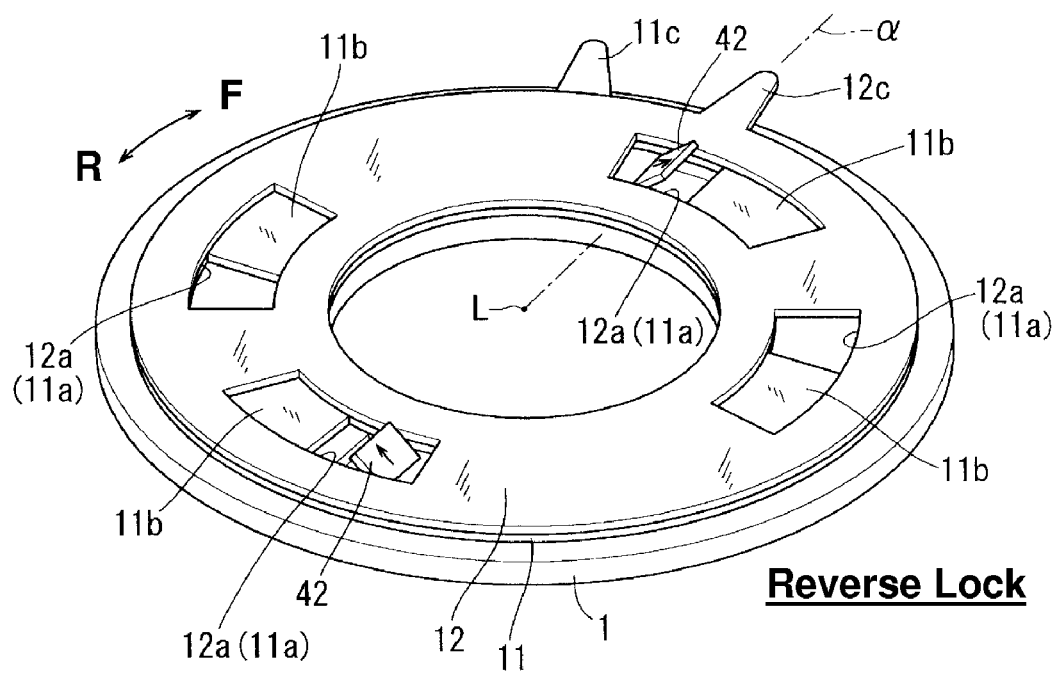
FIG. 7 is a perspective view of the power coupling device according to the embodiment, showing a reverse lock state.

Referring to FIG. 7, only the first retainer plate 11 is shown to be rotated slightly in the reverse direction R from the reference position α to only retract the first strut 41 into the first pocket 21, also as shown in FIG. 3. This achieves a reverse lock state where the second strut 42 restricts the reverse rotation R of the second coupling member 2 with respect to the first coupling member 1.

Figure 8:
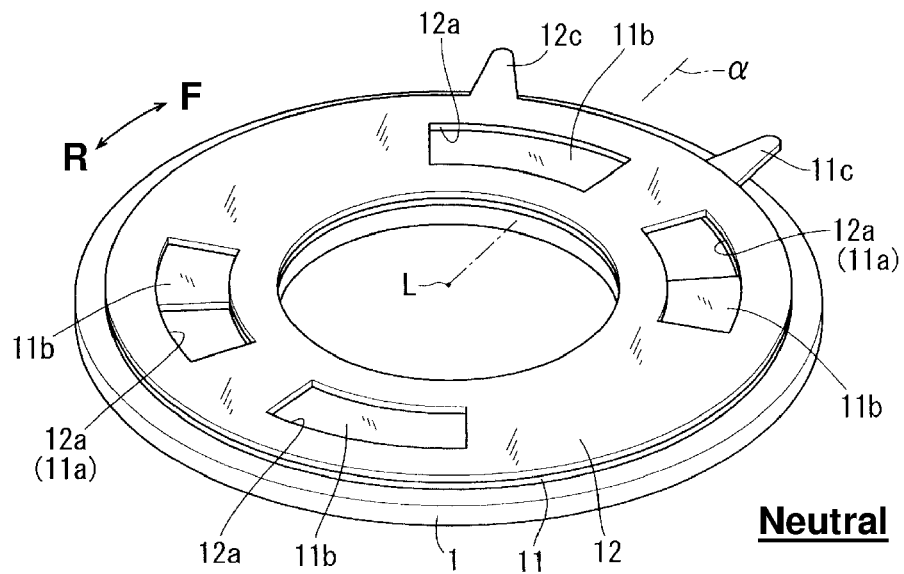
FIG. 8 is a perspective view of the power coupling device according to the embodiment, showing a neutral state.

Referring to FIG. 8, it is shown that the first retainer plate 11 is rotated slightly in the forward direction F from the reference position a, and at the same time the second retainer plate 12 is rotated slightly in the reverse direction R from the reference position a to retract the both first and second struts 41 and 42 into the first and second pockets 21 and 22 respectively. This achieves a neutral state where neither of the first and second struts 41 and 42 restricts the rotation of the second coupling member 2 in terms of the first coupling member 1. In other words, the second coupling member 2 can rotate in the forward and reverse directions F and R in this neutral state, where the second retainer plate 12 retracts the first strut 41 and the first retainer plate 11 retracts the second strut 42.

In the embodiment described above with reference to FIG. 8, the first retainer plate 11 is adjusted angularly into the three positions including the reference position a while the second retainer plate 12 is adjusted angularly into the two positions including the reference position α. The combinations of the angular positions of the first and second retainer plates 11 and 12 may achieve the bidirectional lock state, the forward lock state, the reverse lock state, and the neutral state. The two actuators 61 and 62 individually and respectively activate the first and second retainer plates 11 and 12 in order to achieve the four states described above. Since the first and second retainer plates 11 and 12 are in the same size and shape, the four states may also be achieved by opposite angular relationships between the two plates 11 and 12.

Figure 9:
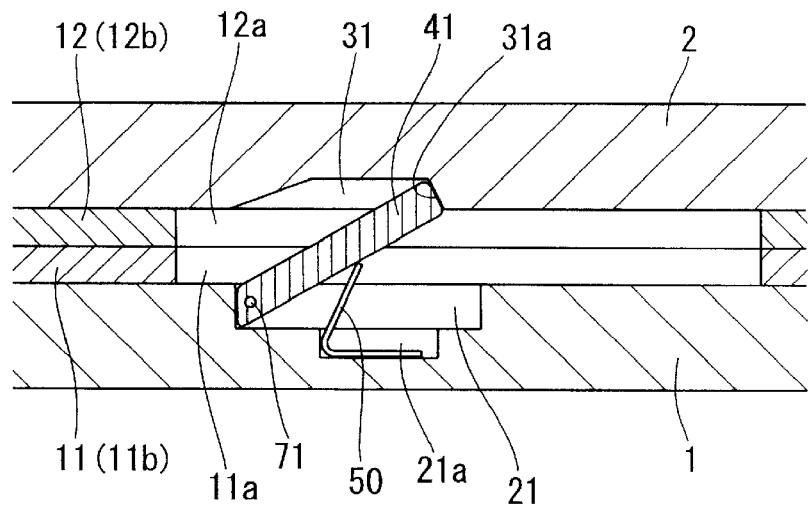
FIG. 9 is a cross sectional view of a power coupling device according to a second embodiment of the present description, illustrating a portion equivalent the left half of FIG. 1.

Referring to FIG. 9, there is shown a power coupling device according to a second embodiment of the present description. Same components have the same reference numerals as in the first embodiment described above and will not be explained for simplicity of the description.

Distinctively in the second embodiment, the strut 41 or 42 is attached through a pin 41 to the first coupling member 1 so that the strut 41 or 42 can be pivot about the axis of the pin 41. The pin 41 may make the pivot movement of the strut smoother. The pin 41 is inserted in a hole opened passing through the strut 41 or 42 in the radial direction of the first coupling member 1. The cross section of the hole may be in a circular shape conforming to that of the pin 41. Or, it may be extended in the longitudinal direction of the strut 41 or 42 so that its end at the pivot side may contact to the corresponding end surface of the pocket 21 or 22 and transmit torque between the first and second coupling members 1 and 2 without torque transmission through the pin 41.

Figure 10:
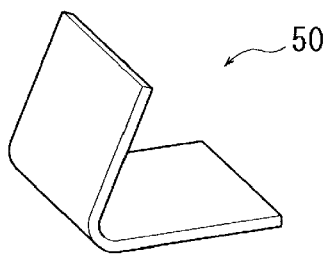
FIG. 10 is a perspective view of a leaf spring used for the power coupling device of FIG. 9.

Further in the second embodiment, instead of the coil spring 51 or 52 in the first embodiment, a leaf spring 50 illustrated in FIG. 10 may be used. The spring 50, 51 or 52 and its arrangement are not limited to those described above, but they may be any type of spring and its arrangement including a coil spring with its spring force in coil axis direction used which is shown in FIG. 6 of U.S. Pat. No. 6,186,299.

Referring to FIGS. 11 through 14, there is shown a power coupling device according to a third embodiment of the present description. Same components have the same reference numerals as in the first embodiment described above and will not be explained for the simplicity of the description. In the third embodiment, to achieve the four state described above, the bidirectional lock state (FIG. 11), the forward lock state (FIG. 12), the reverse lock state (FIG. 13), and the neutral state (FIG. 14), the first and second retainer plates 11 and 12 respectively take two angular positions instead of one taking three and the other taking two in the first embodiment. Therefore, the second embodiment can improve accuracy of the retainer position and simplicity of control of the actuators.

Figure 11:
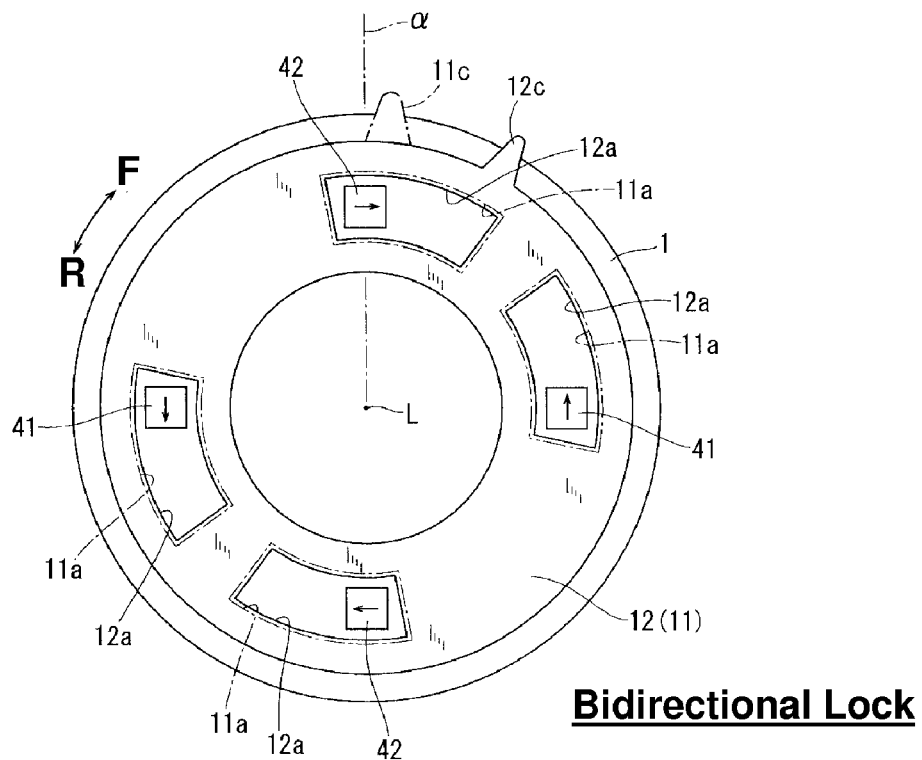
FIG. 11 is a plane view of the power coupling device of a third embodiment of the present description, showing a bidirectional lock state.
Figure 12:
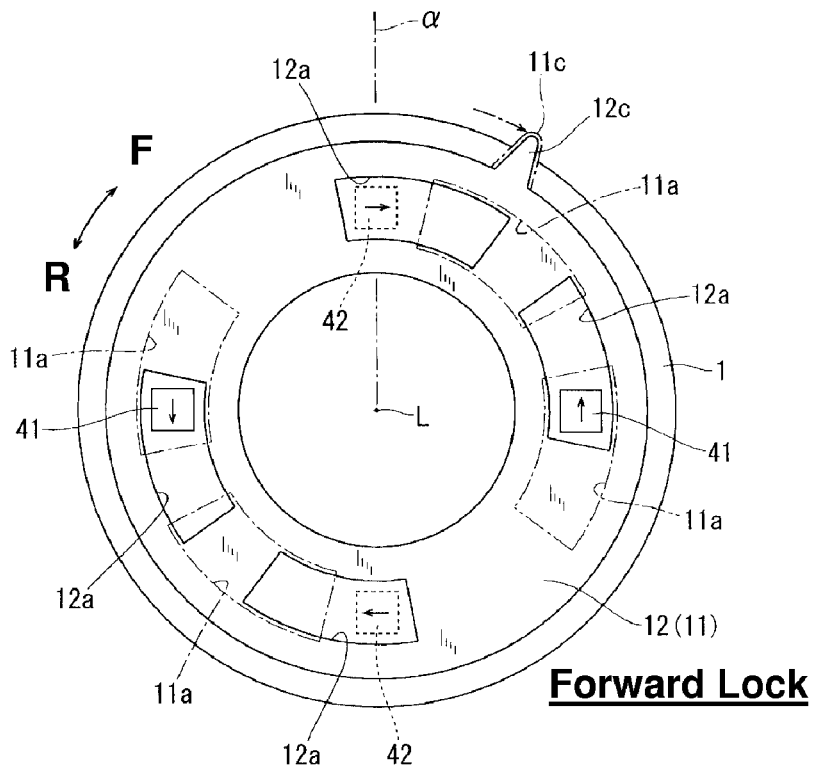
FIG. 12 is a plane view of the power coupling device of FIG. 11, showing a forward lock state.

The bidirectional lock state shown in FIG. 11 corresponds to that in FIG. 4, but the protruding portions 11c and 12c are located differently from in FIG. 4. From the bidirectional lock state, by turning the first retainer plate 11 in the forward direction F, the protruding portion 11c of the first retainer plate 11 aligns with the protruding portion 12c of the second retainer plate 12, and the forward lock state is achieved as shown in FIG. 12.

Figure 13:
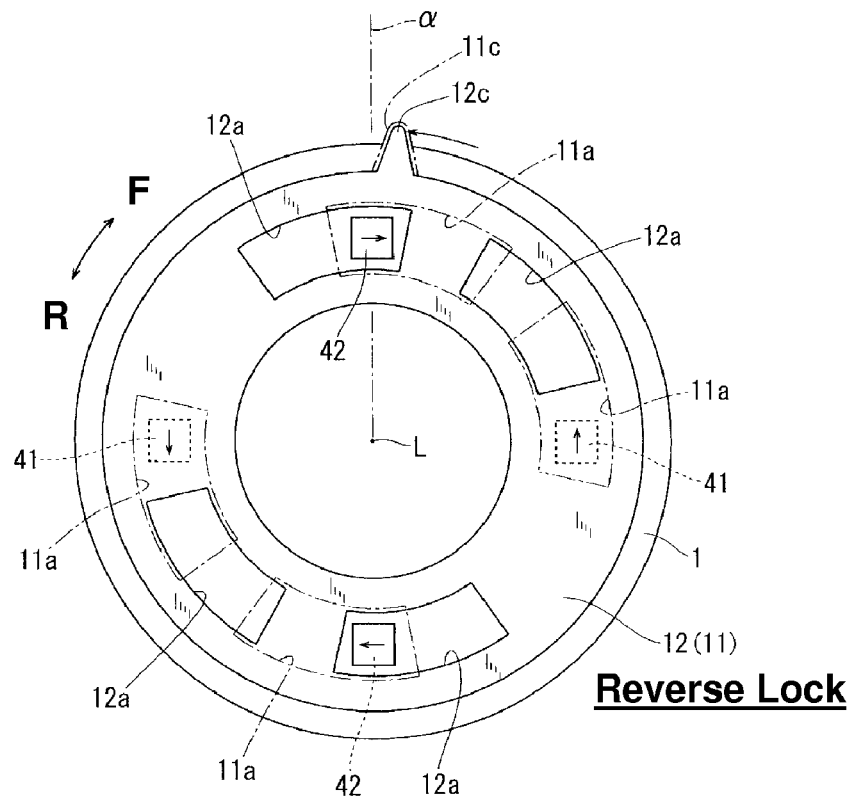
FIG. 13 is a plane view of the power coupling device of FIG. 11, showing a reverse lock state.

From the bidirectional lock state in FIG. 11, by turning the second retainer plate 12 in the reverse direction R, the protruding portion 12c of the second retainer plate 12 aligns with the protruding portion 11c of the first retainer plate 11, and the reverse lock state is achieved as shown in FIG. 13.

Figure 14:
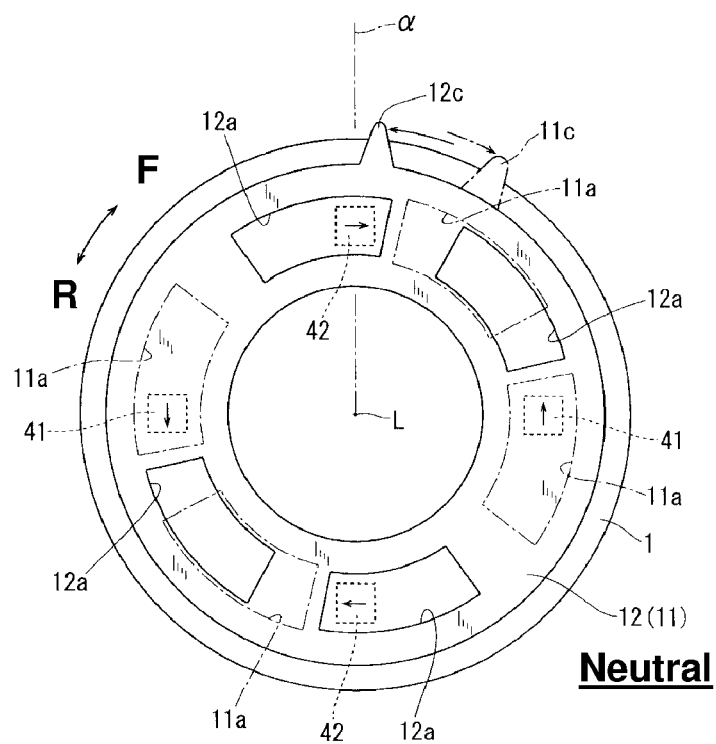
FIG. 14 is a plane view of the power coupling device of FIG. 11, showing a neutral state.

The neutral state may be achieved as shown in FIG. 14, for example, by turning the first retainer plate 11 in the forward direction F and turning the second retainer plate 12 in the reverse direction R from the bidirectional lock state in FIG. 11 until the protruding portions 11c and 12c of the first and second retainer plates 11 and 12 replaces their angular positions with each other.

Figure 15:
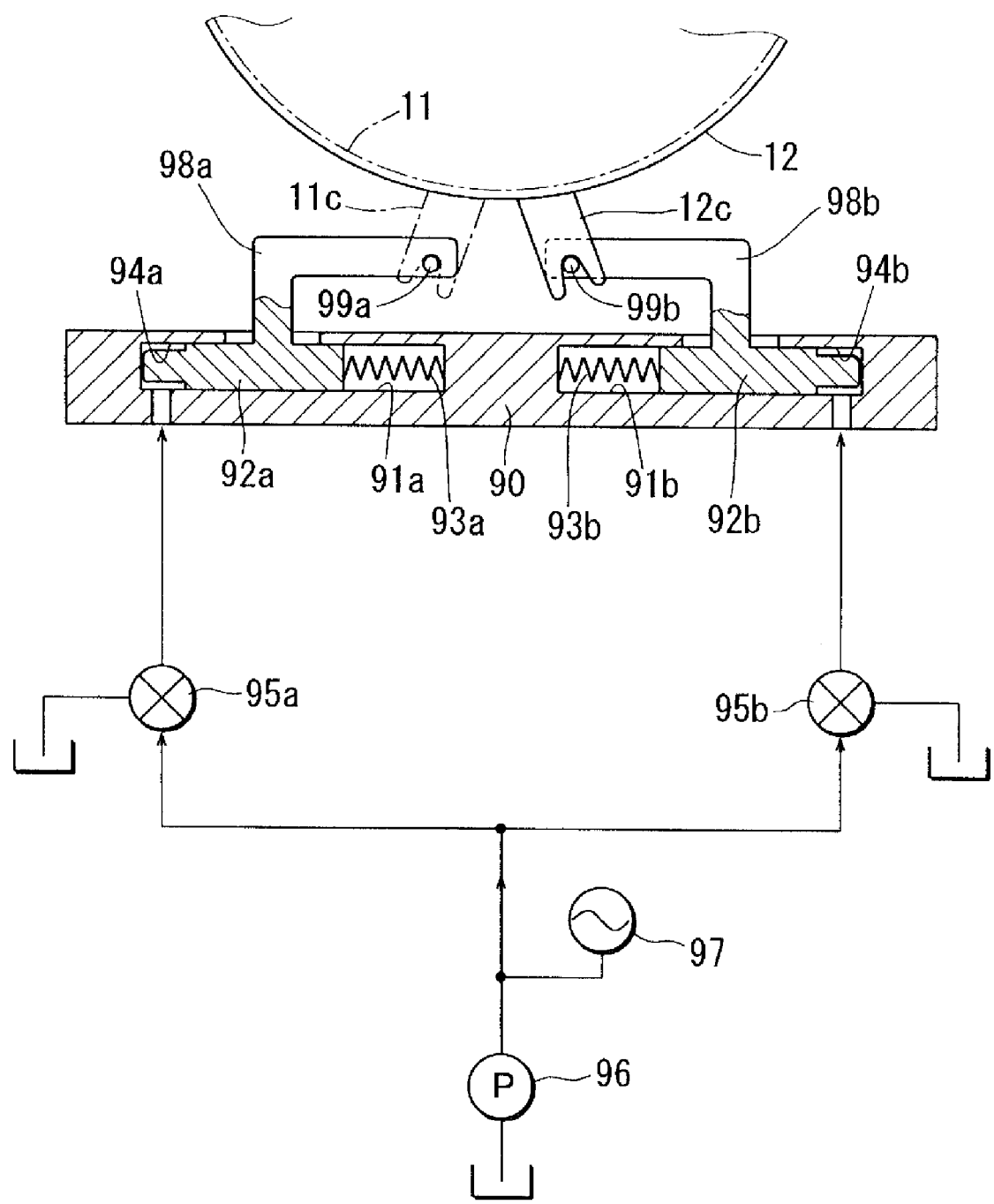
FIG. 15 is a partially cross-sectional system diagram showing an actuator to rotate retainer plates of the power coupling device according to the third embodiment.

Referring to FIG. 15, there is shown a hydraulic actuator to turn the first and second retainer plates 11 and 12 between the two angular positions in the third embodiment. A valve body 90 has two cylinders 91a and 91b formed therein. A first piston 92a and a second piston 92b are arranged respectively in the cylinders 91a and 91b so that the pistons are capable of reciprocating in the cylinders.

Springs 93a and 93b respectively urge the first and second pistons 92a and 92b in the opposite directions. The valve body 90 and the first and second pistons 92 and 92b define hydraulic chambers 94a and 94b. A hydraulic pump 96 and an accumulator 97 may deliver hydraulic pressure to the hydraulic chambers 94a and 94b respectively through switching valves 95a and 95b.

When the switching valve 95a hydraulically connects the hydraulic chamber 94a to the pump 96 and the accumulator 97, the hydraulic pressure displaces the first piston 92a against the force of the spring 93a from one end to the other end of the piston stroke. On the other hand, when the switching valve 95a drains the hydraulic pressure in the hydraulic chamber 94a, the spring 93a returns the first piston 92a to the one end of the piston stroke.

The first piston 92a has the extension arm 98a integrally formed therewith, which extends out of the valve body 90 and has a pin 99a arranged at its end. The pin 99a engages with a concave end of the protruding portion 11c of the first retainer plate 11 so as to convert the linear movement of the first piston 92a to the angular movement of the first retainer plate 11.

The second piston 92b and related components are configured in the same way and put the same reference numerals with "b" instead of "a" as for the first piston 92a and the related components. Therefore, by operating the switching valve 95b, the second piston 92b is linearly displaced, and the linear movement of the second piston 92b is converted into the angular movement of the second retainer plate 12.

In the embodiment of FIG. 15, the hydraulic pump 96 and the accumulator 97 are commonly used for both the first and second pistons 92a and 92b. The force of the springs 93a and 93b may be set with respect to the hydraulic pressure from the pump side so as to achieve the intended end positions of the piston stroke, and the first and second pistons 92a and 92b may be placed accurately in the two stroke end positions. Therefore, the first and second retainer plates 11 and 12 may be accurately placed respectively in the two angular positions.

In the above embodiments, the first and second retainer plates 11 and 12 are in the ring shape and capable of rotating about the common axis L. Thereby, a rotational shaft can be readily arranged extending through the first and second retainer plates 11 and 12.

The first and second pockets 21 and 22 are provided individually for the respective first and second struts 41 and 42 and the related components including the springs 51 and 52. Thereby, any interference between the functions of the first and second struts 41 and 42 can be securely prevented, and flexibility of arrangement of the first and second struts 41 and 42 and related components can be improved.

The first coupling member 1 is permanently fixed to the casing, and does not rotate. Therefore, the struts 41 and 42 arranged on the first coupling member and the related components do not rotate about the common axis L, and this arrangement can make the operation of the power coupling device more stable.

The actuators are provided individually for the first and second retainer plates 11 and 12. Thereby, the angular position of the one retainer plate can be readily adjusted without being affected from the angular position of the other retainer plate.

Having described the embodiments, it is needless to say that the invention is not limited to the illustrated embodiments and that various improvements and alternative designs are possible without departing from the substance of the invention as claimed in the attached claims. For example, the shapes of the first coupling member 1, the second coupling member 2, the first retainer plate 11 and the second retainer plate 12 are not limited to the ring shape illustrated in the figures, but they may be any shape pertinent for the power coupling devices including a disk shape without a center hole to accommodate a shaft.

Although the pockets 21 and 22, the struts 41 and 42 and the springs 51 and 52 are arranged in the first coupling members which is not rotating, they may be arranged in one of the first and second coupling members 1 and 2 which is not rotating (the second coupling member 2 in the embodiments).

Instead of the hydraulic double actuator having two pistons 92a and 91b for the two retainer plates 11 and 12, a link mechanism may be provided for converting movement from a single actuator to the movements of the first and second retainer plates 11 and 12 in order to achieve the four states shown in FIGS. 5 through 8 or the four states shown in FIGS. 11 through 14.

Further, instead of the angular movement of the first and second retainer plates 11 and 12, they may be moved linearly in a plane perpendicular to the common axis L.

The actuators 61 and 62 may be of hydraulic, electric or any type pertinent to actuate the first and second retainer plates 11 and 12.

Number of sets of the first or second pocket 21 or 22 and the components therein such as the strut 41 or 42 is not limited to two described above, but may be one or three or more. Also, the number of sets may be different between the first and second struts 41 and 42 and the related components, for example, in a case where magnitude of transmitted torque are different between the rotational directions.

The invention claimed is:

1. A power coupling device comprising:
    first and second coupling members, at least one of which is capable of rotating about a common axis and relative to each other, said first coupling member having first and second pockets, said second coupling member having first and second notches;
    first and second struts arranged at least partly in said first and second pockets respectively, each of said first and second struts being urged to emerge from said first and second pockets respectively and capable of respectively engaging with one of said first and second notches, said first strut being capable of transmitting torque between said first and second coupling members only in a first direction, said second strut being capable of transmitting torque between said first and second coupling members only in a second direction that is opposite to said first direction; and
    first and second retainer plates arranged between said first and second coupling members and capable of moving in a plane perpendicular to said common axis and independently from each other, said first retainer plate having a first hole which said first or second strut can pass through, said second retainer plate having a second hole which said first or second strut can pass through when said second hole is aligned with said first hole and said first or second strut.

2. The power coupling device as described in claim 1, wherein said first strut is pivoted at its pivot end, and said second strut is pivoted at its pivot end that is opposite to said pivot end of said first strut in a circumferential direction of said first and second coupling members.

3. The power coupling device as described in claim 2, wherein swing ends of said first and second struts that are opposite to said pivot ends are urged to emerge respectively from said first and second pockets.

4. The power coupling device as described in claim 3, further comprising springs respectively arranged in said first and second pockets to urge said swing ends of said first and second struts.

5. The power coupling device as described in claim 1, wherein said first coupling member, said first retainer plate, said second retainer plate, and said second coupling member are arranged in parallel to each other and perpendicular to said common axis.

6. The power coupling device as described in claim 5, wherein said first and second pockets are arranged on a side face of said first coupling member facing to said first retainer plate, and said first and second notches are arranged on a side face of said second coupling member facing to said second retainer plate.

7. The power coupling device as described in claim 1, further comprising a casing which fixedly supports said first coupling member and rotatably supports said second coupling member.

8. The power coupling device as described in claim 1, further comprising:
    a first actuator capable of moving said first retainer plate; and
    a second actuator capable of moving said second retainer plate.

9. The power coupling device as described in claim 1, wherein said first and second retainer plates are configured to enable both said first and second struts to simultaneously pass through both said first and second holes.

10. The power coupling device as described in claim 1, wherein said first and second plates are configured to be able to simultaneously block both said first and second struts.

11. A power coupling device comprising:
    first and second coupling members, at least one of which is capable of rotating about a common axis and relative to each other, said first coupling member having first and second pockets, said second coupling member having first and second notches;
    first and second struts arranged at least partly in said first and second pockets respectively, each of said first and second struts being urged to emerge from said first and second pockets and capable of engaging with one of said first and second notches, said first strut being capable of transmitting torque between said first and second coupling members only in a first direction, said second strut being capable of transmitting torque between said first and second coupling members only in a second direction that is opposite to said first direction; and
    first and second retainer plates arranged between said first and second coupling members capable of rotating about said common axis and independently from each other, said first retainer plate having a first hole which said first or second strut can pass through, said second retainer plate having a second hole which said first or second strut can pass through when said second hole is aligned with said first hole and said first or second strut.

12. The power coupling device as described in claim 11, wherein:
    said first pocket accommodates said first strut and a first spring that urges said first strut out of said first pocket; and
    said second pocket accommodates said second strut and a second spring that urges said second strut out of said second pocket.

13. The power coupling device as described in claim 12, wherein said first strut is pivoted at its one end, said second strut is pivoted at its one end that is opposite to said one end of said first strut in a circumferential direction of said first and second coupling members, said first spring urges an end opposite said one end of said first strut, and said second spring urges an end opposite said one end of said second strut.

14. The power coupling device as described in claim 13, further comprising a casing which fixedly supports said first coupling member and rotatably supports said second coupling member.

15. The power coupling device as described in claim 14, further comprising:
    a first actuator attached to said casing and capable of rotating said first retainer plate; and
    a second actuator attached to said casing and capable of rotating said second retainer plate.

16. The power coupling device as described in claim 15, wherein said first and second retainer plates are configured to enable said first and second struts to simultaneously or individually pass through both said first and second holes.

17. The power coupling device as described in claim 16, wherein said first and second plates are configured to be able to simultaneously block both said first and second struts.

18. The power coupling device as described in claim 17, wherein said first and second plates are configured to respectively take two angular positions to enable said first and second struts to individually or simultaneously pass through said first and second holes and to simultaneously be blocked.

19. The power coupling device as described in claim 11, wherein said first hole and said second hole are of same shape and size.

20. The coupling device as described in claim 19, wherein said first and second plates are of same shape and size.

* * * * *